US008676427B1

(12) United States Patent
Ferguson et al.

(10) Patent No.: US 8,676,427 B1
(45) Date of Patent: Mar. 18, 2014

(54) CONTROLLING AUTONOMOUS VEHICLE USING AUDIO DATA

(71) Applicant: Google Inc., Mountain View, CA (US)

(72) Inventors: David I. Ferguson, Mountain View, CA (US); Jiajun Zhu, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/649,646

(22) Filed: Oct. 11, 2012

(51) Int. Cl.
*G05D 1/00* (2006.01)

(52) U.S. Cl.
USPC .......................................................... 701/23

(58) Field of Classification Search
USPC .......................................................... 701/23
See application file for complete search history.

(56) References Cited

U.S. PATENT DOCUMENTS

| | | | |
|---|---|---|---|
| 8,072,491 B2 | 12/2011 | Kondo et al. | |
| 2009/0066538 A1* | 3/2009 | Thomas et al. | 340/903 |
| 2009/0167512 A1 | 7/2009 | Iwamoto et al. | |
| 2010/0217435 A1* | 8/2010 | Rodemann | 700/245 |
| 2011/0077813 A1* | 3/2011 | Hadsell et al. | 701/26 |

FOREIGN PATENT DOCUMENTS

DE      103 18 294 A1     11/2004

OTHER PUBLICATIONS

Young et al., "Robotic Vehicle Uses Acoustic Sensors for Voice Detection and Diagnostics," Proceedings of SPIE—The International Society for Optical Engineering, Jul. 2007, pp. 72-83.

* cited by examiner

*Primary Examiner* — Mary Cheung
*Assistant Examiner* — Anne Mazzara
(74) *Attorney, Agent, or Firm* — McDonnell Boehnen Hulbert & Berghoff LLP

(57) ABSTRACT

A method includes receiving, at a computing system, audio data from one or more microphones associated with a vehicle. In one example, the audio data originates from a source external to the vehicle and the vehicle is configured to operate in an autonomous mode. The method also includes processing the audio data to generate directional data related to a direction of the source of the audio data relative to the vehicle and processing the audio data to generate identification data related to an identity of the source of the audio data. Further, the method includes controlling the vehicle in the autonomous mode in response to the directional data and the identification data, using the computing system.

23 Claims, 4 Drawing Sheets

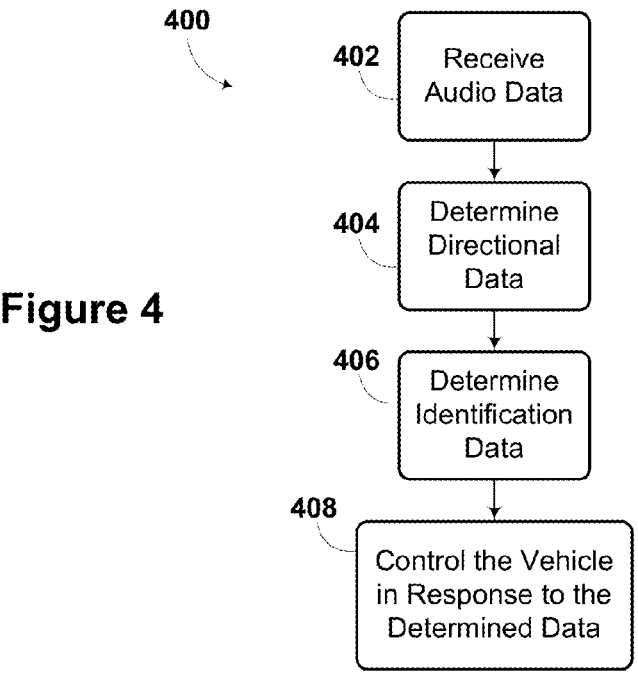

CONTROLLING AUTONOMOUS VEHICLE USING AUDIO DATA

BACKGROUND

Some vehicles are configured to operate in an autonomous mode in which the vehicle navigates through an environment with little or no input from a driver. Such a vehicle typically includes one or more sensors that are configured to sense information about the environment. The vehicle may use the sensed information to navigate through the environment. For example, if the sensors sense that the vehicle is approaching an obstacle, the vehicle may navigate around the obstacle.

SUMMARY

In one example, a method includes receiving, at a computing system, audio data from one or more microphones associated with a vehicle. In the present example, the audio data may originate from a source external to the vehicle and the vehicle can be configured to operate in an autonomous mode. The method also includes processing the audio data to generate directional data related to a direction of the source of the audio data relative to the vehicle and processing the audio data to generate identification data related to an identity of the source of the audio data. Further, the method includes controlling the vehicle in the autonomous mode in response to the directional data and the identification data.

In another example, a non-transitory computer readable medium has stored therein instructions executable by a computer system to cause the computer system to perform functions. The functions include receiving audio data from one or more microphones associated with a vehicle. In the present example, the audio data may originate from a source external to the vehicle and the vehicle can be configured to operate in an autonomous mode. The functions also include processing the audio data to generate directional data related to a direction of the source of the audio data relative to the vehicle and processing the audio data to generate identification data related to an identity of the source of the audio data. Further, the functions include generating control data for controlling the vehicle in the autonomous mode in response to the directional data and the identification data.

In yet another example, a vehicle includes one or more microphones for detecting audio data from a source external to the vehicle and a computing system. The computing system is configured to process the audio data to generate directional data related to a direction of the source of the audio data relative to the vehicle and to process the audio data to generate identification data related to an identity of the source of the audio data. The computing system is also configured to control the vehicle in an autonomous mode in response to the directional data and the identification data.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE DRAWINGS

FIG. 4 shows a method, according to an example embodiment.

FIG. 5 is a schematic diagram of a computer program product, according to an example embodiment.

DETAILED DESCRIPTION

Figure 1:
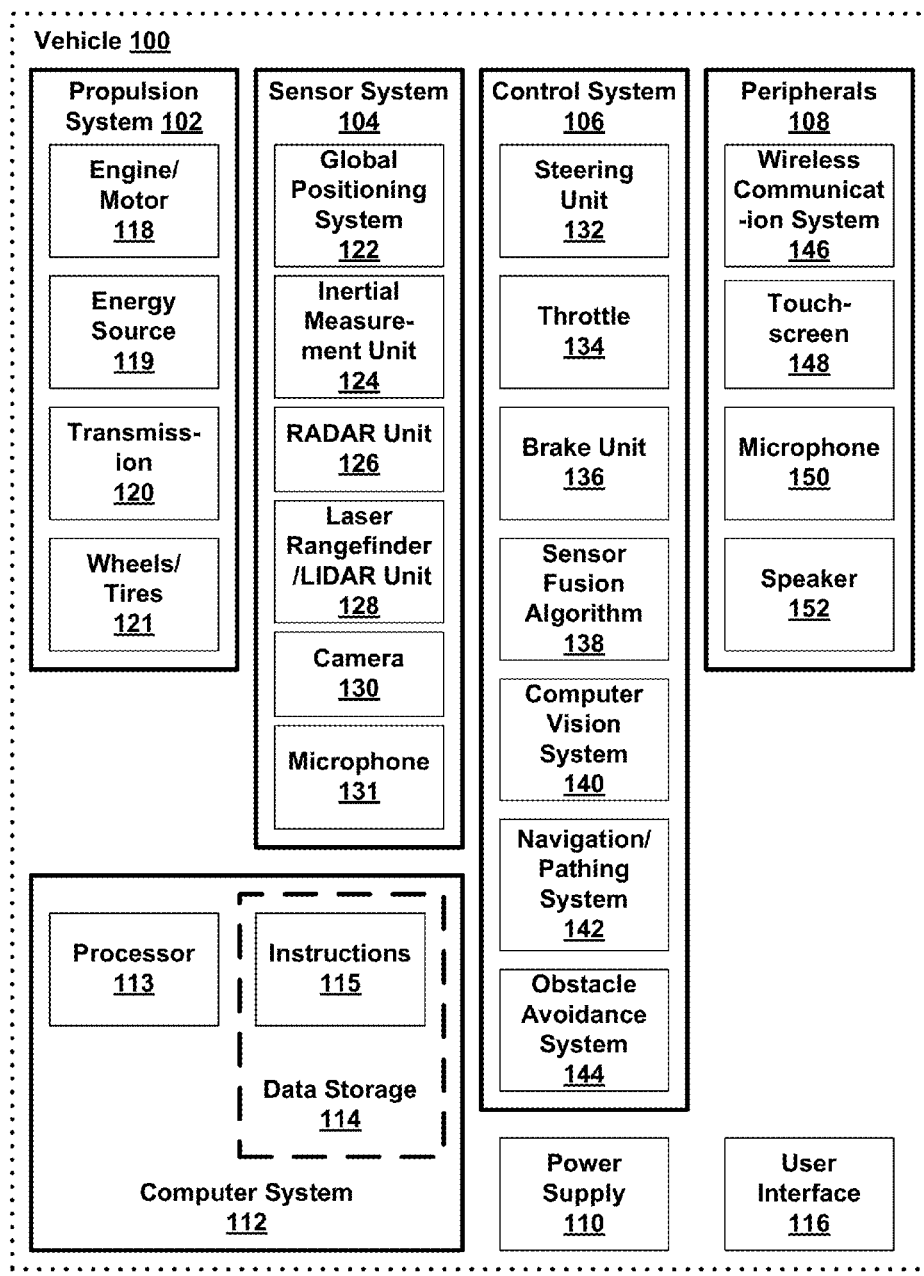
FIG. 1 is a functional block diagram illustrating a vehicle, according to an example embodiment.

Example methods, systems, and computer program produces are described herein. Any example embodiment or feature described herein is not necessarily to be construed as preferred or advantageous over other embodiments or features. The example embodiments described herein are not meant to be limiting. It will be readily understood that certain aspects of the present disclosure can be arranged and combined in a wide variety of different configurations, all of which are contemplated herein.

Within the context of the present disclosure, a vehicle can be operable in various modes of operation. Example modes of operation include manual, semi-autonomous, and autonomous modes. In the autonomous mode, the vehicle can be driven with little or no user interaction. In the manual and semi-autonomous modes, the vehicle can be driven entirely and partially, respectively, by a user.

Some examples disclosed herein are carried out in part or in full by a vehicle configured to operate in an autonomous mode with or without external interaction, such as from a user of the vehicle. Illustratively, the vehicle (or a computing system associated with the vehicle) can receive audio data. In one example, the computing system may determine that the audio data originates form a source external to the vehicle, as opposed to verbal commands from a passenger in the vehicle, for example. In the present example, the computing system processes the audio data to determine directional data and identification data relating to the audio data. Generally, the directional data is related to a direction of the source of the audio data relative to the vehicle and the identification data is related to an identity of the source of the audio data. In some scenarios the directional data may indicate that the direction of the source is uncertain. Likewise, the identification data may indicate that the identity of the source is uncertain. In these cases, the directional data and/or the identification data can serve as placeholders for such data to be determined or updated at a later time. For example, if the directional data and/or the identification data are uncertain, additional sensors associated with the vehicle can be directed to detect additional data relating to the source of the audio data. In any event, the computing system can control the vehicle in the autonomous mode using the directional data and the identification data. Such control in the autonomous mode may include, without limitation, controlling movement of the vehicle with little or no user interaction, providing information to a user of the vehicle, and controlling other sensors of the vehicle to detect additional information related to the source.

Further, the computing system can control the vehicle in the autonomous mode using additional data, such as data relating to a current state of the vehicle. For instance, the vehicle may acquire data about various propulsion, sensor, and control systems of the vehicle (e.g., revolutions per minute, vehicle speed, current driving lane, fuel level, brake fluid level, etc.). The computing system can also control the vehicle in the autonomous mode using other data related to an environment of the vehicle. This environmental data may include information regarding external driving conditions (e.g., ice on the roadway), speed of another vehicle, and location of another vehicle.

Generally, various examples disclosed herein can be carried out or implemented in part or in full by a server in communication with the vehicle. In an example embodiment, a server may receive sensor data relevant to a vehicle operating in an autonomous mode, such as sound data and a plurality of images captured using a camera. This sensor data can be used by the server to determine instructions for controlling the vehicle in one or more modes of operation. Further, the server can remotely control the vehicle in the autonomous mode by providing, for instance, instructions to adjust various aspects of a control system of the vehicle (e.g., throttle, brake unit, steering unit, and the like). Other interactions between a vehicle operating in an autonomous mode and a server are possible within the context of the disclosure.

A vehicle is also described in the present disclosure. The vehicle may include elements such as a sensor system and a computer system. The sensor system can be configured to acquire vehicle state information (information about the vehicle itself) and environment state information (information about the environment of the vehicle, such as audio data originating from a source external to the vehicle). The computer system can be configured to perform various functions based in full or in part on the acquired information.

Also disclosed herein are non-transitory computer readable media with stored instructions. The instructions can be executable by a computing device to cause the computing device to perform functions as described herein.

Example systems within the scope of the present disclosure will now be described in greater detail. An example system may be implemented in or may take the form of an automobile. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, and trolleys. Other vehicles are possible as well.

FIG. 1 is a functional block diagram illustrating a vehicle 100, according to an example embodiment. The vehicle 100 can be configured to operate fully or partially in an autonomous mode with little or no user interaction. More particularly, the vehicle 100 can be configured to operate in an autonomous mode utilizing sensor data, specifically audio data. In the present example, the vehicle 100 includes various subsystems, including a propulsion system 102, a sensor system 104, a control system 106, one or more peripherals 108, as well as a power supply 110, a computer system 112, and a user interface 116. The vehicle 100 may include additional or fewer subsystems and each subsystem may include one or more elements. Further, the subsystems and elements of the vehicle 100 can be interconnected. Thus, one or more of the functions of the vehicle 100 may be divided into additional functional or physical components, or combined into fewer functional or physical components. In other examples, additional functional and/or physical components may be added to the example illustrated by FIG. 1.

The propulsion system 102 in FIG. 1 includes components operable to provide powered motion for the vehicle 100. In the present non-limiting example, the propulsion system 102 includes an engine/motor 118, an energy source 119, a transmission 120, and wheels/tires 121. The engine/motor 118 can be any combination of an internal combustion engine, an electric motor, steam engine, Stirling engine, or other types of engines and/or motors. In some embodiments, the engine/motor 118 may be configured to convert the energy source 119 into mechanical energy. In some embodiments, the propulsion system 102 includes multiple types of engines and/or motors. For instance, a gas-electric hybrid car typically includes a gasoline engine and an electric motor. Other examples are also possible and contemplated in the present disclosure.

The energy source 119 generally represents a source of energy that may, in full or in part, power the engine/motor 118. That is, the engine/motor 118 can be configured to convert the energy source 119 into mechanical energy. Examples of energy sources 119 include gasoline, diesel, other petroleum-based fuels, propane, other compressed gas-based fuels, ethanol, solar panels, batteries, and other sources of electrical power. The energy source(s) 119 additionally or alternatively may include any combination of fuel tanks, batteries, capacitors, and/or flywheels. The energy source 119 may also provide energy for other systems of the vehicle 100.

Generally, the transmission 120 includes elements that are operable to transmit mechanical power from the engine/motor 118 to the wheels/tires 121. Illustratively, the transmission 120 may include a gearbox, clutch, differential, drive shafts, and other elements. The drive shafts can include one or more axles that can be coupled to the one or more wheels/tires 121.

The wheels/tires 121 of vehicle 100 can be configured in various formats, including a unicycle, bicycle/motorcycle, tricycle, or car/truck four-wheel format. Other wheel/tire geometries are possible, such as those including six or more wheels. Any combination of the wheels/tires 121 of vehicle 100 may be operable to rotate differentially with respect to other wheels/tires. The wheels/tires 121 can represent at least one wheel that is fixedly attached to the transmission 120 and at least one tire coupled to a rim of the wheel that makes contact with the driving surface. The wheels/tires 121 may include any combination of metal and rubber, or other combinations of materials.

Further, the sensor system 104 may include a number of sensors configured to sense information about an environment of the vehicle 100. For example, in FIG. 1, the sensor system 104 includes a Global Positioning System (GPS) 122, an inertial measurement unit (IMU) 124, a RADAR unit 126, a laser rangefinder/LIDAR unit 128, a camera 130, and an audio sensor or microphone 131. The sensor system 104 may also include sensors configured to monitor internal systems of the vehicle 100 (e.g., oxygen monitor, fuel gauge, engine oil temperature). Other sensors are possible as well. One or more of the sensors included in the sensor system 104 can be configured to be actuated separately and/or collectively in order to modify a position, focus, and/or an orientation of the one or more sensors.

More particularly, the GPS 122 may be any sensor configured to estimate a geographic location of the vehicle 100. To this end, the GPS 122 can include a transceiver operable to provide information regarding the position of the vehicle 100 with respect to the Earth. The IMU 124 can include any combination of sensors (e.g., accelerometers and gyroscopes) configured to sense position and orientation changes of the vehicle 100 based on inertial acceleration.

Further, the RADAR unit 126 may represent a system that utilizes radio signals to sense objects within the local environment of the vehicle 100. In some embodiments, in addition to sensing the objects, the RADAR unit 126 may additionally be configured to sense the speed and/or heading of the objects. Similarly, the laser rangefinder or LIDAR unit 128 may be any sensor configured to sense objects in the environment in which the vehicle 100 is located using lasers. Depending upon the embodiment, the laser rangefinder/LI- DAR unit 128 can include one or more laser sources, a laser scanner, and one or more detectors, among other system components. In one example, the laser rangefinder/LIDAR unit 128 is configured to operate in a coherent (e.g., using heterodyne detection) or an incoherent detection mode.

The camera 130 can include one or more devices configured to capture a plurality of images of the environment of the vehicle 100. The camera 130 can be a still camera or a video camera. In addition, the microphone 131 can include one or more devices configured to detect audio data. In one example, the microphone 131 is configured to detect audio data that originates from sources external to the vehicle 100.

Generally, the control system 106 is configured to control operation of the vehicle 100 and its various components and elements. Accordingly, in the present example, the control system 106 includes steering unit 132, throttle 134, brake unit 136, a sensor fusion algorithm 138, a computer vision system 140, a navigation/pathing system 142, and an obstacle avoidance system 144. The control system 106 may additionally or alternatively include components other than those shown and described herein.

In the present example, the steering unit 132 represents any combination of mechanisms that are operable to adjust a heading of the vehicle 100. Further, the throttle 134 is configured to control, for instance, the operating speed of the engine/motor 118 and, in turn, to control the speed of the vehicle 100. The brake unit 136 includes any combination of mechanisms configured to decelerate the vehicle 100. For example, the brake unit 136 can use friction to slow the wheels/tires 121. In other embodiments, the brake unit 136 can convert kinetic energy of the wheels/tires 121 to electric current. The brake unit 136 may take other forms as well.

In addition, the sensor fusion algorithm 138 can be an algorithm (or a computer program product storing an algorithm) configured to accept data from the sensor system 104 as an input. The data may include, for example, data representing information sensed at the sensors of the sensor system 104. The sensor fusion algorithm 138 may include, for instance, a Kalman filter, Bayesian network, or other algorithm. The sensor fusion algorithm 138 can further provide various assessments based on the data from the sensor system 104. Depending upon the embodiment, the assessments may include evaluations of individual objects and/or features in the environment of the vehicle 100, evaluation of a particular situation, and/or evaluations of possible impacts based on the particular situation. Other assessments are also possible.

In one example, the sensor fusion algorithm 138 can process audio data from the microphone 131 to determine additional information therefrom. Illustratively, the sensor fusion algorithm 138 can process the audio data to determine that the audio data originates from a source external to the vehicle 100, to determine directional data relating to a direction and/or distance of the source of the audio data relative to the vehicle, and to determine identification data related to an identity of the source of the audio data. To determine that the audio source is external to the vehicle and to determine the directional data, the sensor fusion algorithm 138 may use various techniques including, for example, a Doppler Effect analysis, audio triangulation methods, audio amplitude analysis, and other acoustic processing techniques. The audio amplitude analysis, according to one example, includes comparing the amplitude or volume of the audio data detected around the vehicle. Illustratively, if a microphone at a back of the vehicle detects the audio data with a higher amplitude than a microphone at a front of the vehicle, then the sensor fusion algorithm 138 may determine that the audio data originates from a source behind the vehicle.

Further, to determine the identification data, the sensor fusion algorithm 138 may use the above and other techniques, such as a sound recognition algorithm that compares features (e.g., frequency, spectrum, amplitude, etc.) of the audio data to stored audio features that are associated with known sources of audio data. Such stored audio features can be stored in data storage 114 or can be stored on a remote server.

The computer vision system 140 may be any system operable to process and analyze images captured by the camera 130 in order to identify objects and/or features in the environment of the vehicle 100 that includes, for example, traffic signals, road way boundaries, other vehicles, and obstacles. The computer vision system 140 may use an object recognition algorithm, a Structure From Motion (SFM) algorithm, video tracking, and other computer vision techniques. In some embodiments, the computer vision system 140 can be additionally configured to map an environment, track objects, estimate the speed of objects, etc.

The navigation/pathing system 142 may be any system configured to determine a driving path for the vehicle 100. The navigation/pathing system 142 may additionally be configured to update the driving path dynamically while the vehicle 100 is in operation. In some embodiments, the navigation/pathing system 142 can be configured to incorporate data from the sensor fusion algorithm 138, the GPS 122, and one or more predetermined maps so as to determine the driving path for the vehicle 100.

In the example of FIG. 1, the obstacle avoidance system 144 represents a control system configured to identify, evaluate, and avoid or otherwise negotiate potential obstacles in the environment of the vehicle 100.

The peripherals 108 may be configured to allow interaction between the vehicle 100 and external sensors, other vehicles, other computer systems, and/or a user (either remote or a passenger in the vehicle). For example, the peripherals 108 in FIG. 1 include a wireless communication system 146, a touchscreen 148, a microphone 150, and a speaker 152. The peripherals 108 can also allow a user of the vehicle 100 to interact with the user interface 116. To this end, the touchscreen 148 can provide information to a user of vehicle 100. The user interface 116 can also be operable to accept input from the user via the touchscreen 148. The touchscreen 148 may be configured to sense at least one of a position and a movement of a user's finger via capacitive sensing, resistance sensing, or a surface acoustic wave process, among other possibilities. The touchscreen 148 may be capable of sensing finger movement in a direction parallel or planar to the touchscreen surface, in a direction normal to the touchscreen surface, or both, and may also be capable of sensing a level of pressure applied to the touchscreen surface. The touchscreen 148 may be formed of one or more translucent or transparent insulating layers and one or more translucent or transparent conducting layers. The touchscreen 148 may take other forms as well.

The microphone 150 can be configured to receive audio (e.g., a voice command or other audio input) from a user of the vehicle 100. Similarly, the speakers 152 may be configured to output audio to the user of the vehicle 100.

In one example, the wireless communication system 146 is configured to wirelessly communicate with one or more devices directly or via a communication network. For example, wireless communication system 146 can use 3G cellular communication, such as CDMA, EVDO, GSM/GPRS, or 4G cellular communication, such as WiMAX or LTE. Alternatively, wireless communication system 146 can communicate with a wireless local area network (WLAN), for example, using WiFi. In some embodiments, wireless communication system 146 communicates directly with a device, for example, using an infrared link, Bluetooth, or ZigBee. Other wireless protocols, such as various vehicular communication systems, are possible within the context of the disclosure. For example, the wireless communication system 146 may include one or more dedicated short range communications (DSRC) devices that include public and/or private data communications between vehicles and/or roadside stations.

The power supply 110 can provide power to various components of the vehicle 100 and can represent, for example, a rechargeable lithium-ion or lead-acid battery. In some embodiments, one or more banks of such batteries are configured to provide electrical power to the vehicle 100. Other power supply materials and configurations are possible. In some embodiments, the power supply 110 and the energy source 119 can be implemented together, as in some all-electric cars.

Many or all of the functions of the vehicle 100 can be controlled by the computer system 112. In FIG. 1, the computer system 112 includes at least one processor 113 (which may include at least one microprocessor) that executes instructions 115 stored in a non-transitory computer readable medium, such as data storage 114. The computer system 112 may also represent a plurality of computing devices that serve to control individual components or subsystems of the vehicle 100 in a distributed fashion.

In some embodiments, the data storage 114 contains the instructions 115 (e.g., program logic) executable by the processor 113 to perform various functions of the vehicle 100, including those described above in connection with FIG. 1. The data storage 114 may contain additional instructions 115 as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. Such information may be used by the vehicle 100 and the computer system 112 during the operation of the vehicle in the autonomous, semi-autonomous, and/or manual operating modes.

The vehicle 100 illustrated in the block diagram of FIG. 1 also includes the user interface 116 for providing information to or receiving input from a user of the vehicle 100. In one example, the user interface 116 controls or enables control of content and/or the layout of interactive images that can be displayed on the touchscreen 148. Further, the user interface 116 can include one or more input/output devices within the set of peripherals 108, such as the wireless communication system 146, the touchscreen 148, the microphone 150, and the speaker 152.

The computer system 112 can control the function of the vehicle 100 based on inputs received from various subsystems (e.g., the propulsion system 102, the sensor system 104, and the control system 106), as well as from the user interface 116. For example, the computer system 112 may utilize input from the control system 106 in order to control the steering unit 132 to avoid an obstacle detected by the sensor system 104 and the obstacle avoidance system 144. In other examples, the computer system 112 can be operable to provide control over many aspects of the vehicle 100 and its subsystems.

Generally, the components of vehicle 100 can be configured to work in an interconnected fashion with other components within or outside their respective systems. For instance, the camera 130 can capture a plurality of images that represent information about a state of an environment of the vehicle 100 operating in an autonomous mode. The environment may include another vehicle and the camera 130 can capture one or more images of the other vehicle. The computer vision system 140 can recognize the other vehicle as such based on object recognition models stored in the data storage 114. Further, the microphone 131 can capture audio data and the sensor fusion algorithm 138 can process the audio data to determine additional information. In one example, the sensor fusion algorithm 138 processes the audio data to determine that the audio data originates from an emergency vehicle that is approaching the vehicle 100 from ahead. The sensor fusion algorithm 138 can process the audio data and the images from the camera 130 to further confirm that an emergency vehicle is approaching the vehicle 100 from ahead. In the present example, the computer system 112 can then carry out several determinations based on this information. For example, the computer system 112 may determine that the vehicle 100 should slow down and pull over to the side of the roadway. This determination can be communicated to the user visually and/or audibly. In one example, in the autonomous mode, the computer system 112 interacts with the data storage 114 and other systems to control the control system 106 to execute the determination and cause the vehicle 100 to slow down and pull over.

Although FIG. 1 shows various components of the vehicle 100, such as the wireless communication system 146, the computer system 112, the data storage 114, and the user interface 116, as being integrated into the vehicle 100, one or more of these components may be mounted or associated separately from the vehicle 100. For example, data storage 114 may, in part or in full, exist separate from the vehicle 100. Thus, the vehicle 100 can be provided in the form of device elements that may be located separately or together. The device elements that make up the vehicle 100 can be communicatively coupled together in a wired and/or wireless fashion.

Figure 2:
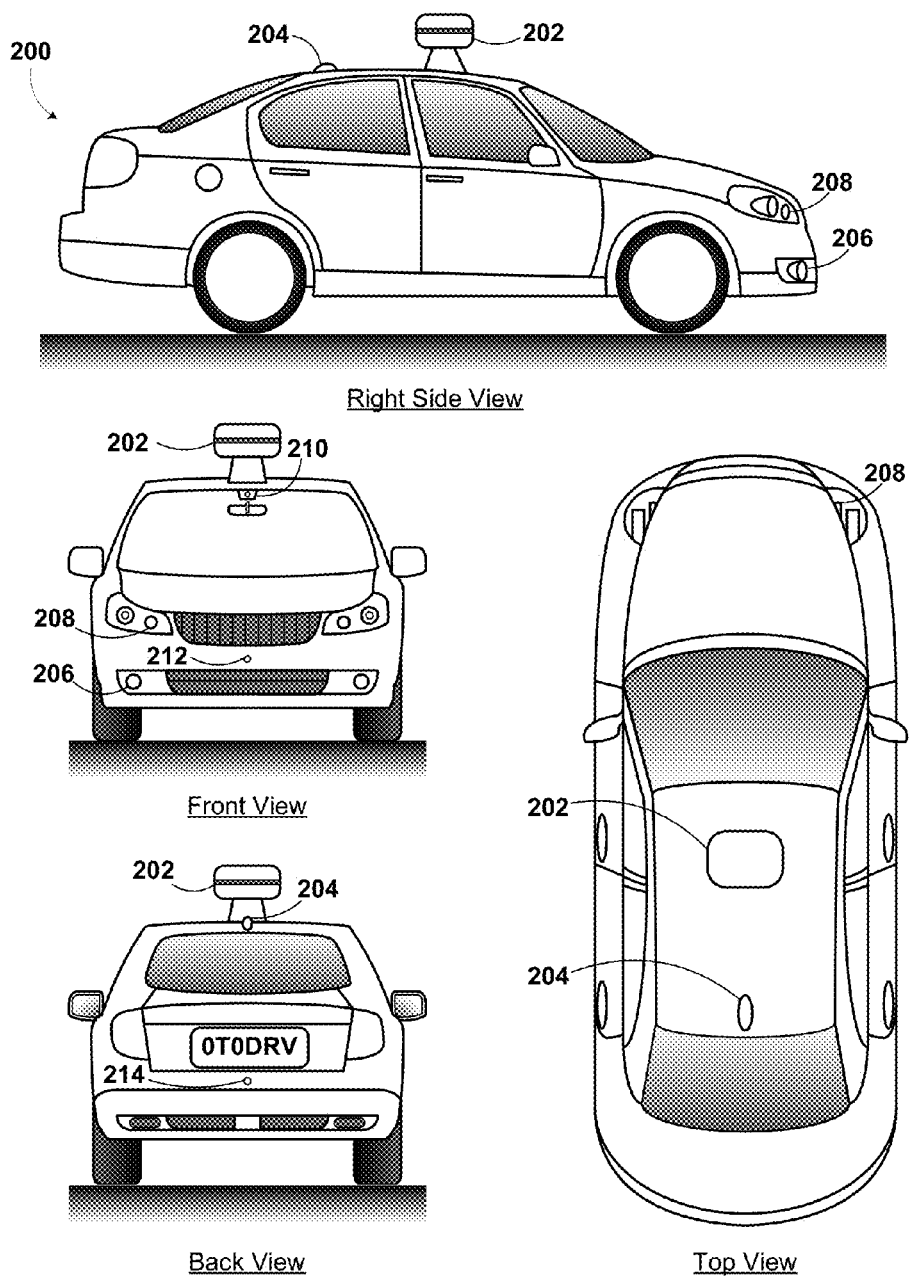
FIG. 2 shows a vehicle, according to an example embodiment.

FIG. 2 shows a vehicle 200 that can be similar or identical to the vehicle 100 of FIG. 1. Although the vehicle 200 is illustrated in FIG. 2 as a car, other embodiments are possible. For instance, the vehicle 200 can represent a truck, a van, a semi-trailer truck, a motorcycle, a golf cart, an off-road vehicle, or a farm vehicle, among other examples.

Further, the vehicle 200 illustrated in FIG. 2 includes a sensor unit 202, a wireless communication system 204, a LIDAR unit 206, a laser rangefinder unit 208, a camera 210, and microphones 212. Generally, the vehicle 200 may include some or all of the elements described for FIG. 1. In one example, the sensor unit 202 includes one or more different sensors configured to capture information about an environment of the vehicle 200. For example, the sensor unit 202 can include any combination of cameras, RADARs, LIDARs, range finders, and audio sensors. Other types of sensors are also possible.

The sensor unit 202 may also include one or more movable mounts that are operable to adjust the orientation of one or more sensors in the sensor unit 202. In one embodiment, the movable mount includes a rotating platform that can scan sensors so as to obtain information from each direction around the vehicle 200. In another embodiment, the movable mount of the sensor unit 202 can be moveable in a scanning fashion within a particular range of angles and/or azimuths. The sensor unit 202 can be mounted atop the roof of the vehicle 200, for instance, however other mounting locations are possible. Additionally, the sensors of the sensor unit 202 can be distributed in different locations and need not be collocated at a single location. Some possible sensor types and mounting locations include LIDAR unit 206, laser rangefinder unit 208, a front microphone 212, and a rear microphone 214. In other embodiments, the vehicle 200 may include multiple front and/or rear microphones, as well as, microphones disposed along sides of the vehicle. Generally, each sensor of the sensor unit 202 can be configured to be moved or scanned independently of other sensors of sensor unit 202.

In another example, one or more of the sensors of the sensor unit 202 or other sensors associated with the vehicle 200 can be electronically scanned or focussed in different directions around the vehicle. This electronic scanning or focussing can be implemented in addition to or instead of the movable mount described above.

Referring again to the microphones 212, 214 disposed around the vehicle, audio data from these microphones (and possibly other microphones configured to detect audio data around the vehicle) can be compared to each other to determine a direction of the source of the audio data relative to the vehicle. For example, if the rear microphone 214 detects the audio data with a higher amplitude than the front microphones 212, then the vehicle 200 may determine that the audio data source is behind the vehicle. In another example, a similar analysis can be performed with a single microphone that is configured to detect audio data from different directions around the vehicle.

Further, the audio data can be analysed at different times to determine a general direction that the audio data source is traveling with respect to the vehicle. Illustratively, if the rear microphone 214 detects the audio data at a first time with a first amplitude and detects the audio data at a second later time at a second greater amplitude, then the vehicle may determine that the audio data source is approaching the vehicle from behind.

In FIG. 2, the wireless communication system 204 is located on a roof of the vehicle 200. Alternatively, the wireless communication system 204 can be located, fully or in part, elsewhere. The wireless communication system 204 may include wireless transmitters and receivers that are configured to communicate with devices external or internal to the vehicle 200. More particularly, the wireless communication system 204 can include transceivers configured to communicate with other vehicles and/or computing devices, for instance, in a vehicular communication system or a roadway station. Examples of such vehicular communication systems include dedicated short range communications (DSRC), radio frequency identification (RFID), and other proposed communication standards directed towards intelligent transport systems.

In another example, the wireless communication system 204 can be configured to facilitate communications between the vehicle 200 and external sensors, for example, traffic sensors, microphones, cameras, that are not physically coupled to the vehicle 200 but are communicatively coupled through the wireless communication system 204. In this example, sensor data from these external sensors can be used in similar manners to the sensor data from the sensor unit 202 and/or other sensors disposed on the vehicle.

The camera 210 may be any known camera (e.g., a still camera or a video camera) configured to capture a plurality of images of the environment around the vehicle 200. To this end, the camera 210 may be configured to detect visible light, or may be configured to detect light from other portions of the spectrum, such as infrared or ultraviolet light. Other types of cameras are possible as well.

The camera 210 may be a two-dimensional detector or may have a three-dimensional spatial range. In some embodiments, the camera 210 may be, for example, a range detector configured to generate a two-dimensional image indicating a distance from the camera 210 to a number of points in the environment. To this end, the camera 210 may use one or more range detecting techniques. For example, the camera 210 may use a structured light technique in which the vehicle 200 illuminates an object in the environment with a predetermined light pattern, such as a grid or checkerboard pattern and uses the camera 210 to detect a reflection of the predetermined light pattern off the object. Based on distortions in the reflected light pattern, the vehicle 200 may determine distances to the points on the object. The predetermined light pattern may comprise infrared light, or light of other wavelengths.

As another example, the camera 210 may use a laser scanning technique in which the vehicle 200 emits a laser and scans across a number of points on an object in the environment. While scanning the object, the vehicle 200 uses the camera 210 to detect a reflection of the laser off the object for each point. Based on a length of time it takes the laser to reflect off the object at each point, the vehicle 200 may determine the distance to the points on the object.

The camera 210 can be mounted inside a front windshield of the vehicle 200. Specifically, as illustrated, the camera 210 can capture images from a forward-looking view with respect to the vehicle 200. Other mounting locations and viewing angles of camera 210 are possible, either inside or outside the vehicle 200. Further, the camera 210 can have associated optics that are operable to provide an adjustable field of view. Still further, the camera 210 can be mounted to the vehicle 200 with a movable mount that is operable to vary a pointing angle of the camera 210.

Figure 3:
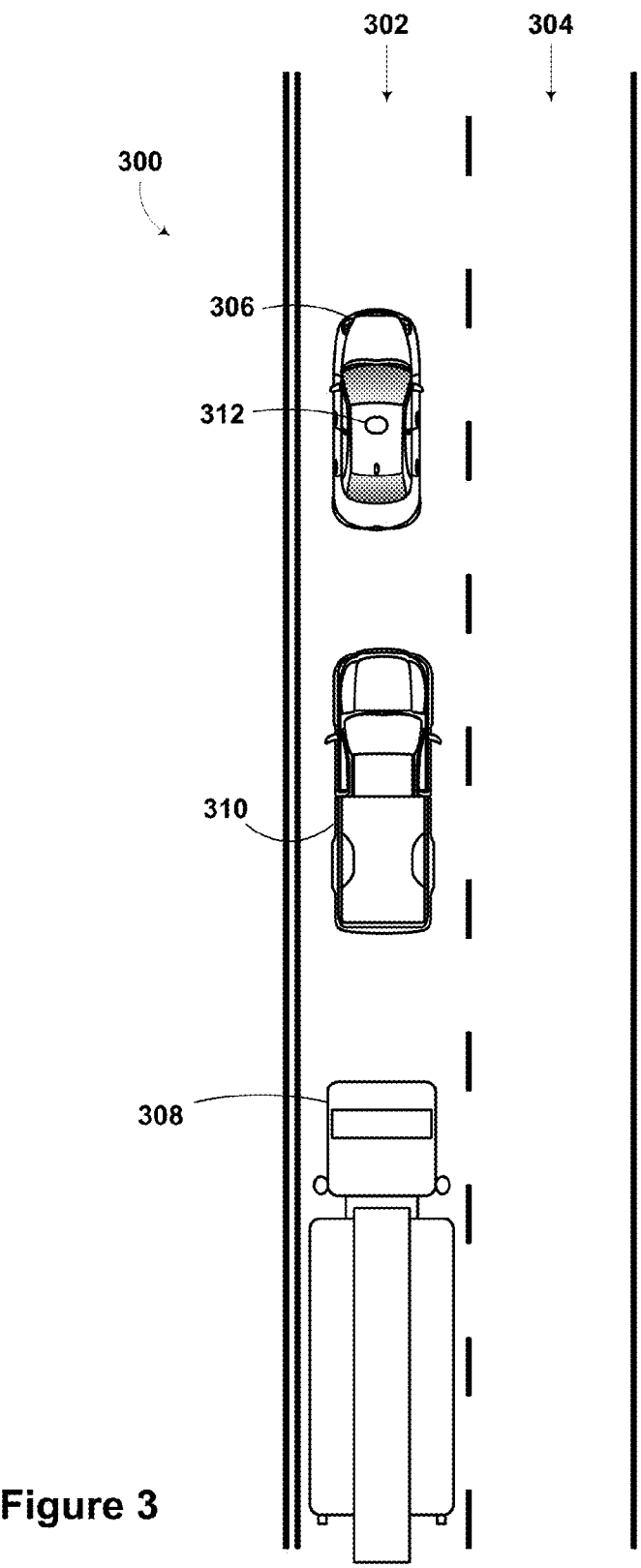
FIG. 3 is a top view of an autonomous vehicle operating scenario, according to an example embodiment.

FIG. 3 illustrates a scenario 300 involving a roadway with a left lane 302 and a right lane 304. In FIG. 3, a vehicle 306, such as one of the vehicles 100, 200 described above, is moving in the left lane 302. The vehicle 306 can be operating in an autonomous mode. In FIG. 3, an emergency vehicle 308, such as a fire truck, is approaching the vehicle 306 from behind in the left lane 302. In the present example, the emergency vehicle 308 is responding to an emergency and, thus, is flashing emergency lights and emitting an audible siren. Further, another vehicle 310 is also moving in the left lane 302 and is between the vehicle 306 and the emergency vehicle 308. At times, the other vehicle 310 may block a view of the emergency vehicle 308 from the vehicle 306.

A sensor unit 312 of the vehicle 308 can continuously or periodically capture sensor data relating to an environment of the vehicle 308. In the present example, the sensor unit 310 represents one or more sensors, such as a camera, GPS, one or more microphones (such as the front and rear microphones 212, 214 of FIG. 2), etc. More particularly, the microphone(s) detect audio data, which includes the siren of the emergency vehicle 308. A computer system of the vehicle 306, such as the computer system 112 and the control system 106 of FIG. 1, process the audio data to determine that the siren is associated with an emergency vehicle and to determine that the emergency vehicle is approaching the vehicle 306 from behind in the left lane 302. For example, a rear microphone can detect the siren at a higher amplitude or volume than a front microphone.

In one example, the computer system of the vehicle 306 can also direct other sensors toward the origin of the siren to detect additional data relating to the source. Illustratively, the computer system can direct the camera behind the vehicle 306 to confirm that there are flashing emergency lights from the emergency vehicle 308 approaching in the left lane 302. Accordingly, the computer system can control the vehicle 306 in the autonomous mode based on the audio data and optionally other data. In the scenario 300 of FIG. 3, the computer system can control the vehicle 306 to slow down and pull over into the right lane 304.

Referring now to FIG. 4, a method 400 is provided for controlling a vehicle in an autonomous mode using audio data. The method can be performed using any of the systems of FIGS. 1 and 2, although, other systems and configurations can also be used. Further, some or all of the processes described in relation to FIG. 4 can be performed partially or fully by a computing system or server that is separate from the vehicle but is in communication with the vehicle. FIG. 4 illustrates the steps in an example method, however, it is understood that in other embodiments, the steps may appear in different order and steps may be added or subtracted.

At block 402 of FIG. 4, a computer system associated with a vehicle receives audio data, such as from one or more microphones. The computer system can be physically integrated with the vehicle or can include any other computing device associated with the vehicle. For example, the computer system may include one or more elements of FIG. 1 and/or may include a server network in communication with the vehicle. At block 402, the computer system may also determine whether the audio data originated from a source external to the vehicle. This process can be performed to distinguish external audio data from audio data originating from inside the vehicle, such as verbal commands from a passenger. As discussed above, the sensor fusion algorithm 138 of FIG. 1 can be utilized to process the audio data to determine that the source of the audio data is external to the vehicle. In another example, the microphone(s) that are used to detect the audio data can be configured to focus only on exterior audio data, which may eliminate the need to separately determine that the audio data is from an external source.

At block 404, the computer system processes the audio data to determine directional data related to a direction of a source of the audio data relative to the vehicle. In some cases, the audio data may include sounds that originate from different sources. In these cases, the computer system may isolate different audio data sources at block 404 and determine the directional data of each audio data source. As described generally above, the sensor fusion algorithm 138 can be utilized to process the audio data to determine the directional data.

At block 406, the computer system processes the audio data to determine identification data related to an identity of the source of the audio data. As described generally above, the sensor fusion algorithm 138 can be utilized to process the audio data to determine the identity data.

In FIG. 4, at block 408, the computer system utilizes the directional data and the identification data to control the vehicle. More particularly, the computer system can utilize the directional data and the identification data to control the vehicle in an autonomous mode of operation. For example, responsive to the directional data and the identification data, the computer system can control movement of the vehicle with little or no user interaction, provide information to a user of the vehicle, control other sensors of the vehicle to detect additional information related to the source, and/or perform any of a range of other behaviours. One non-limiting example of the processes that can be executed at the block 408 is described above in relation to FIG. 3.

Example methods, such as method 400 of FIG. 4, may be carried out in whole or in part by the vehicle and its subsystems. Accordingly, example methods can be described by way of example herein as being implemented by the vehicle. However, it should be understood that an example method may be implemented in whole or in part by other computing devices. For example, an example method may be implemented in whole or in part by a server system, which receives data from a device such as those associated with the vehicle. Other examples of computing devices or combinations of computing devices that can implement an example method are possible.

In some embodiments, the disclosed methods may be implemented as computer program instructions encoded on a non-transitory computer-readable storage media in a machine-readable format, or on other non-transitory media or articles of manufacture. FIG. 5 is a schematic illustrating a conceptual partial view of an example computer program product that includes a computer program for executing a computer process on a computing device, arranged according to at least some embodiments presented herein.

In one embodiment, the example computer program product 500 is provided using a signal bearing medium 502. The signal bearing medium 502 may include one or more programming instructions 504 that, when executed by one or more processors provide functionality or portions of the functionality described above with respect to FIGS. 1-4. In some examples, the signal bearing medium 502 may encompass a computer-readable medium 506, such as, but not limited to, a hard disk drive, a Compact Disc (CD), a Digital Video Disk (DVD), a digital tape, memory, etc. In some implementations, the signal bearing medium 502 may encompass a computer recordable medium 508, such as, but not limited to, memory, read/write (R/W) CDs, R/W DVDs, etc. In some implementations, the signal bearing medium 502 may encompass a communications medium 510, such as, but not limited to, a digital and/or an analog communication medium (e.g., a fiber optic cable, a waveguide, a wired communications link, a wireless communication link, etc.). Thus, for example, the signal bearing medium 502 may be conveyed by a wireless form of the communications medium 510.

The one or more programming instructions 504 may be, for example, computer executable and/or logic implemented instructions. In some examples, a computing device such as the computer system 112 of FIG. 1 may be configured to provide various operations, functions, or actions in response to the programming instructions 504 conveyed to the computer system 112 by one or more of the computer readable medium 506, the computer recordable medium 508, and/or the communications medium 510.

The non-transitory computer readable medium can also be distributed among multiple data storage elements, which could be remotely located from each other. The computing device that executes some or all of the stored instructions can be a vehicle, such as the vehicle 200 illustrated in FIG. 2. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments are possible. The various aspects and embodiments disclosed herein are for purposes of illustration and are not intended to be limiting, with the true scope and spirit being indicated by the following claims.

What is claimed is:

1. A method comprising:
receiving, at a computing system, audio data from one or more microphones associated with a vehicle, wherein the audio data originates from a source external to the vehicle, and wherein the vehicle is configured to operate in an autonomous mode;

processing the audio data to generate directional data related to a direction of the source of the audio data relative to the vehicle;
processing the audio data to generate identification data related to an identity of the source of the audio data; and
controlling the vehicle in the autonomous mode in response to the directional data and the identification data, using the computing system.

2. The method of claim 1, wherein controlling the vehicle in the autonomous mode includes controlling movement of the vehicle.

3. The method of claim 1, wherein controlling the vehicle in the autonomous mode includes controlling one or more other sensors associated with the vehicle.

4. The method of claim 3, wherein controlling the one or more other sensors includes directing the one or more other sensors toward the source of the audio data to detect additional data relating to the source.

5. The method of claim 3, wherein the one or more sensors include at least one of an image sensor, a radar sensor, or a laser sensor.

6. The method of claim 1, further comprising processing the audio data to determine that the audio data originates from a source external to the vehicle.

7. The method of claim 1, wherein processing the audio data to generate identification data includes extracting audio features from the audio data and comparing the extracted audio features with stored audio features that are associated with known sources of audio data.

8. The method of claim 1, wherein the directional data relates to the source of the audio data approaching the vehicle and the identification data relates to an emergency vehicle, further wherein controlling the vehicle in response to the directional data and the identification data includes controlling the vehicle to reduce its speed and to pull over out of the way of the approaching emergency vehicle.

9. A non-transitory computer readable medium having stored therein instructions executable by a computer system to cause the computer system to perform functions, the functions comprising:
receiving audio data from one or more microphones associated with a vehicle, wherein the audio data originates from a source external to the vehicle, and wherein the vehicle is configured to operate in an autonomous mode;
processing the audio data to generate directional data related to a direction of the source of the audio data relative to the vehicle;
processing the audio data to generate identification data related to an identity of the source of the audio data; and
generating control data for controlling the vehicle in the autonomous mode in response to the directional data and the identification data.

10. The non-transitory computer readable medium of claim 9, wherein controlling the vehicle in the autonomous mode includes controlling movement of the vehicle.

11. The non-transitory computer readable medium of claim 9, wherein controlling the vehicle in the autonomous mode includes controlling one or more other sensors associated with the vehicle.

12. The non-transitory computer readable medium of claim 11, wherein controlling the one or more other sensors includes directing the one or more other sensors toward the source of the audio data to detect additional data relating to the source.

13. The non-transitory computer readable medium of claim 9, wherein the functions further comprise processing the audio data to determine that the audio data originates from a source external to the vehicle.

14. The non-transitory computer readable medium of claim 9, wherein processing the audio data to generate identification data includes extracting audio features from the audio data and comparing the extracted audio features with stored audio features that are associated with known sources of audio data.

15. The non-transitory computer readable medium of claim 9, wherein when the directional data relates to the source of the audio data approaching the vehicle and when the identification data relates to an emergency vehicle, controlling the vehicle in response to the directional data and the identification data includes controlling the vehicle to reduce its speed and to pull over out of the way of the approaching emergency vehicle.

16. A vehicle comprising:
one or more microphones for detecting audio data from a source external to the vehicle; and
a computing system configured to:
process the audio data to generate directional data related to a direction of the source of the audio data relative to the vehicle;
process the audio data to generate identification data related to an identity of the source of the audio data; and
control the vehicle in an autonomous mode in response to the directional data and the identification data.

17. The vehicle of claim 16, wherein the computing system is configured to control movement of the vehicle in the autonomous mode.

18. The vehicle claim 16, wherein the computing system is configured to control one or more other sensors associated with the vehicle in the autonomous mode.

19. The vehicle of claim 18, wherein the computing system is configured to control the one or more other sensors associated with the vehicle in the autonomous mode by directing the one or more other sensors toward the source of the audio data to detect additional data relating to the source.

20. The vehicle of claim 19, wherein the one or more sensors include at least one of an image sensor, a radar sensor, or a laser sensor.

21. The vehicle of claim 16, wherein the computing system is configured to process the audio data to determine that the audio data originates from a source external to the vehicle.

22. The vehicle of claim 16, wherein the computing system is configured to generate the identification data by extracting audio features from the audio data and comparing the extracted audio features with stored audio features that are associated with known sources of audio data.

23. The vehicle of claim 16, wherein when the directional data relates to the source of the audio data approaching the vehicle and when the identification data relates to an emergency vehicle, the processor is configured to control the vehicle to reduce its speed and to pull over out of the way of the approaching emergency vehicle.

* * * * *